April 25, 1933.　　　　　K. J. TOBIN　　　　　1,906,022
PLIABLE CHOCK BLOCK
Filed March 11, 1929　　　2 Sheets-Sheet 1
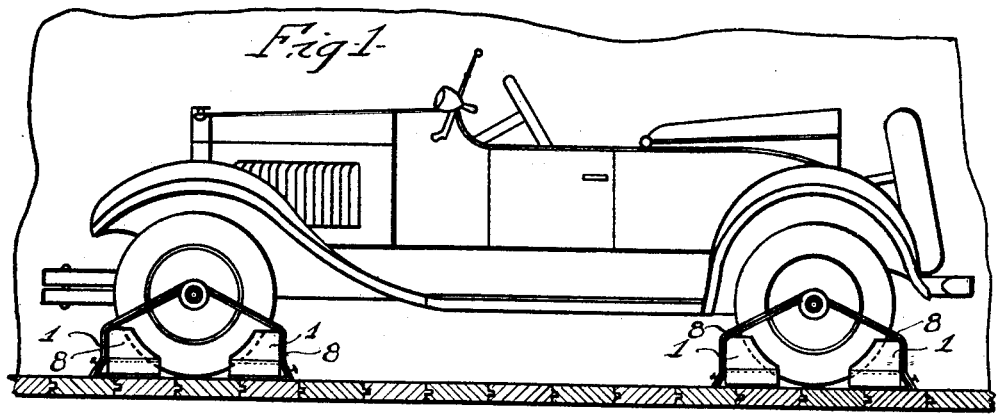
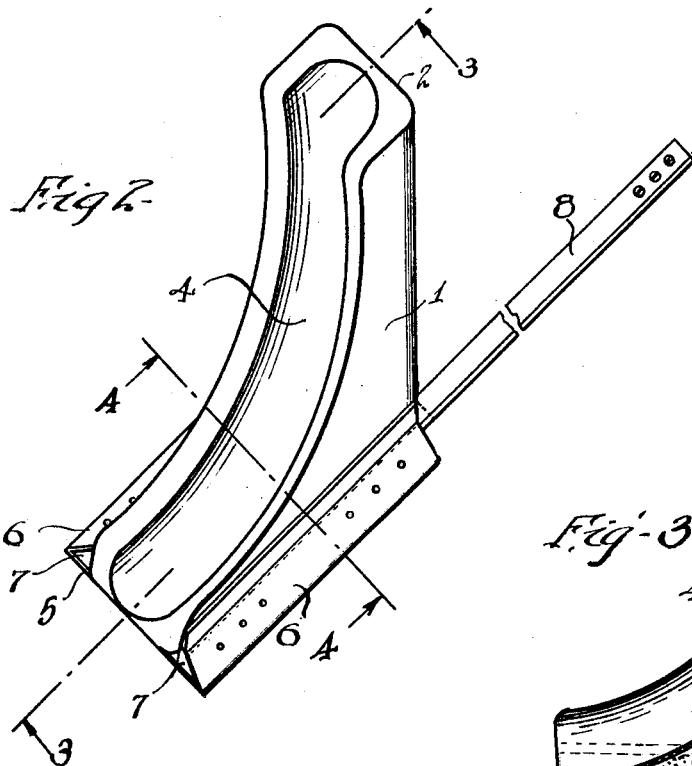
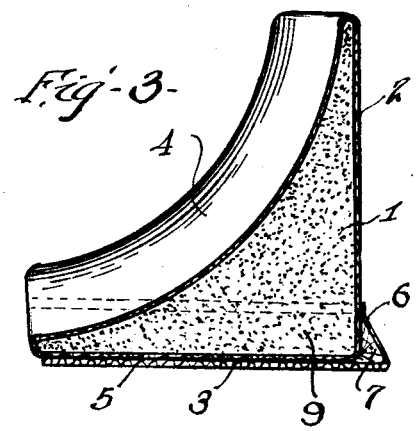
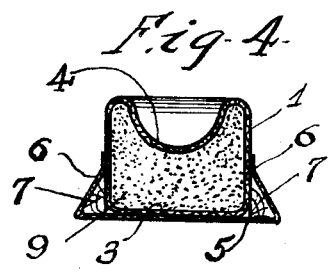
Inventor.
Kenneth J. Tobin
By: Charles Hill
Attys

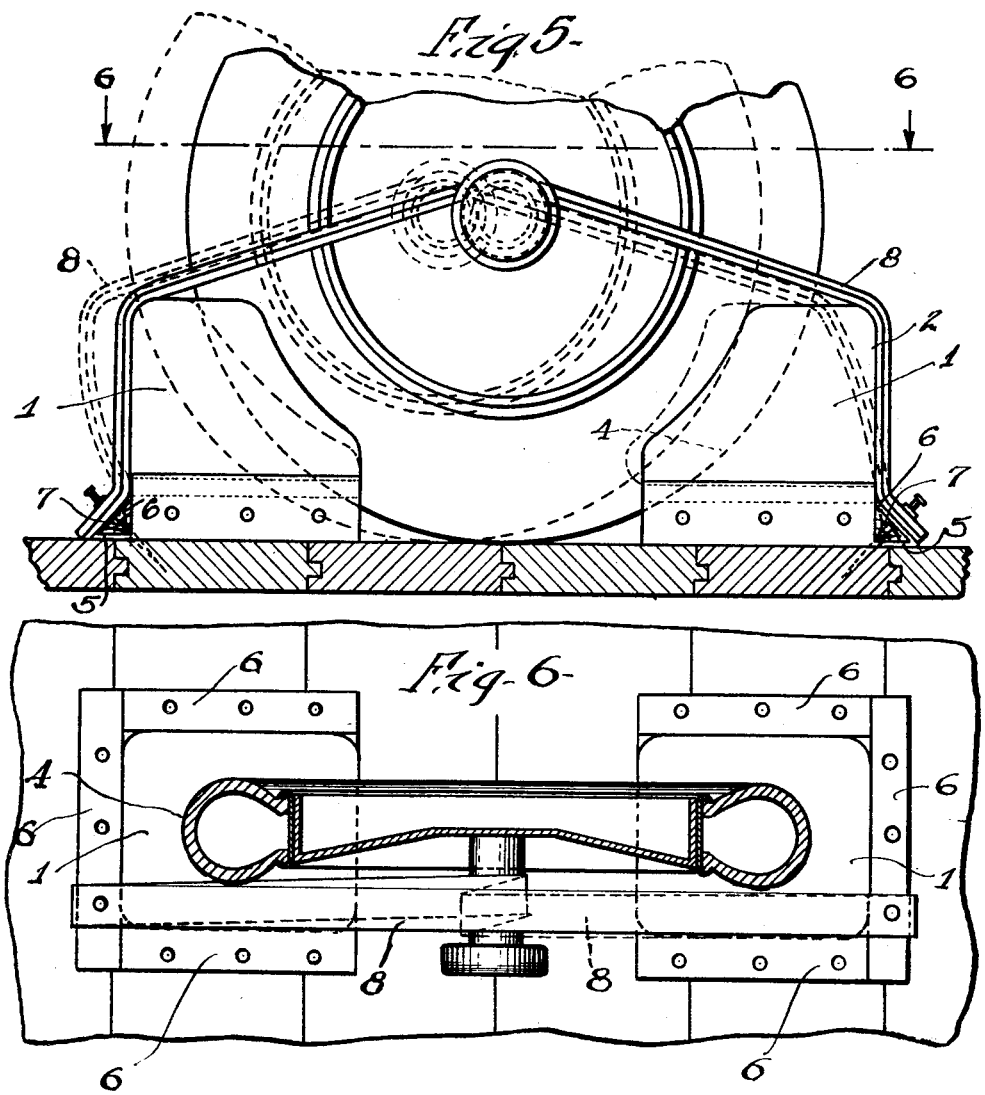

Patented Apr. 25, 1933

1,906,022

UNITED STATES PATENT OFFICE

KENNETH J. TOBIN, OF CHICAGO, ILLINOIS, ASSIGNOR TO CAMEL COMPANY, OF CHICAGO, ILLINOIS, A CORPORATION OF ILLINOIS

PLIABLE CHOCK BLOCK

Application filed March 11, 1929. Serial No. 346,121.

This invention relates to chock blocks for vehicle wheels that are more particularly adapted to be secured to the floor of a freight car for blocking automobiles against displacement while in transportation.

It is common practice among shippers to use a wooden block which is grooved to provide a bearing surface for engagement with a portion of the tire of the vehicle wheel. In most instances two of these blocks are used for each wheel or eight blocks for the four wheels of the automobile. Usually there is also a hold-down tie which consists of a cable or metal strap which extends over the wheel hub or axle and is nailed to the floor of the car upon opposite sides of the wheel in order to hold the wheel down against the chock blocks.

In the past these chock blocks have usually been made of wood or pressed steel or some other rigid material. In the first place the material is rather expensive as these chock blocks are seldom used more than once. When an automobile having balloon tires or a tire of large cross sectional area is secured with these blocks and the hold-down ties mentioned above, there is a certain amount of air which escapes from the tires. This allows the automobile to come closer to the floor of the car and consequently the tie-downs become loose. As a result, the automobile is liable to bump up and down or rock and if one or more tires are sufficiently deflated, they will be liable to be cut by the rims. In transit, the cars are shunted around and often handled very roughly, with the result that the automobiles are frequently damaged in addition to the cutting of the tires for which the railroad company is responsible.

A further objection to the use of wooden blocks or other rigid blocks made of artificial stone, concrete, papier-mâché or other materials, is that the blocks crack and split, and if pine wood is used the pitch is very objectionable. The composition blocks are often broken in securing them to the floor of the freight car and the wooden blocks often crack during the drying out process, and when nailed down.

This invention is designed to overcome the objections above noted with respect to rigid chock blocks. To this end, the chock blocks are made of a flexible or mobile character in order that the same may readily conform to any variations in the pneumatic tires on the wheels and compensate for all looseness irrespective of whether the automobile tends to rock in a forward or rearward direction, and in which the hold-down ties are nearly always taut.

The invention comprises the novel structure and combination of parts hereinafter described and more particularly pointed out and defined in the appended claims.

In the accompanying drawings which illustrate a preferred form of this invention and in which similar reference numerals refer to similar features in the different views:

Figure 1 is an elevational view of an automobile which is anchored between chock blocks involving this invention.

Figure 2 is an enlarged perspective view of a chock block involving this invention.

Figure 3 is an enlarged sectional view taken upon the line III—III of Figure 2.

Figure 4 is a sectional view taken upon the line IV—IV of Figure 2.

Figure 5 is an enlarged fragmentary elevational view of a pneumatic wheel anchored in chock blocks involving this invention and showing the positions of parts in dotted lines when the wheel is rocked or moved or when the tube becomes somewhat deflated.

Figure 6 is a sectional view taken upon the line VI—VI of Figure 5 looking in the direction of the arrow.

The invention in its broadest aspects contemplates a deformable chock block which will automatically adjust itself to variations in the pneumatic tire or to movements thereof so that the wheel will always be firmly gripped between the chock blocks. The illustrated embodiment of this invention consists of a flexible bag or shoe 1. This bag or shoe may be made of suitable fabric or similar materials that provide sufficient flexibility. The shoe is made with a straight vertical portion 2 and a horizontal portion 3 which constitutes the base thereof. Between the vertical portion 2 and the horizontal portion 3 there is an arcuate grooved portion 4 which is adapted for receiving a pneumatic tire. This arcuate portion 4 is integrally connected with the vertical and horizontal portion 3 by what may be termed the side of the shoe. A fabric member 5 or the like extends across the bottom of the shoe and the side edges of this member 5 overlap the sides of the shoe while the rear portion overlaps the rear portion of the shoe as indicated at 6 in Figure 4. It will be noted that the sides of the fabric 5 loosely overlap the sides of the shoe proper to provide suitable pockets for the insertion of triangular nailing strips 7 whereby the shoe may be nailed to the floor of a car. The strip 5 that overlaps the vertical face 1 as shown more clearly in Figures 3 and 5 also provides a pocket for the insertion of a wooden nailing strip 7. Upon the rear wooden nailing strip 7 of each chock block, there is adapted to be secured one end of a strap or tie member 8. When a pair of chock blocks are assembled in relation to a wheel, a strap attached to one chock block may be wrapped around the hub of the wheel as shown in Figure 6 and then extended over the rear wall of the other chock block and fastened to the rear nailing strip thereof. Figure 6 illustrates diagrammatically one strap wrapped over the top, down and around the hub. Of course, in actual practice, the portions coming up from the bottom of the hub must pass the upper portion, which may be forced to one side, a feature which could only be partially illustrated in Figure 6 without obscuring the drawings. Another strap 8 may then be attached to the rear nailing strip of one chock block and extended over the hub of the wheel and attached to the rear nailing strip of the other chock block. Merely one method has been illustrated for tying the chock block to a wheel having a hub. It is, however, immaterial over what portion of the wheel the tie straps pass as long as they serve to anchor the wheel to such blocks. It will be noted that the straps 8 extend up the vertical ends of the chock blocks and extend over the top thereof with the result that the tie straps tend to hold the chock blocks against the wheel especially if the wheel should rock in a forward or rearward direction.

The chock blocks 1 are flexible or mobile in that they can readily adjust themselves to variations in the pneumatic tire or to the forward or rearward rocking movement of the wheels that they anchor. In order to render the blocks sufficiently mobile, some suitable material is placed within the bags or shoes. This substance should be sufficiently mobile in order that it may freely flow or move in accordance with the deflation or movement of the pneumatic wheel. In the present instance the bags or shoes are shown as filled with sand 9 which can be readily deformed and which will readily conform to all variations in the deflation of the pneumatic wheel or to rocking movements thereof. For example if the pneumatic tire should be deflated, it will naturally sink a certain amount and produce more or less slack in the tie straps 8. At the same time the flexible chock blocks will spread apart and carry the tie strap therewith taking up all the slack therein and if the tire should shift as shown in dotted lines in Figure 5, the tie straps would follow the chock blocks as shown in dotted lines in Figure 5.

According to this invention the pneumatic wheel is always compactly retained by the mobile chock blocks 1 which adjust themselves as the exigency of the case require. Now suppose that the wheels should move in a forward direction and compress the forward chock blocks, the tie straps will pull the rear chock blocks forwardly and still maintain the wheels compactly anchored between the chock blocks. It will also be appreciated that the flexible character of the chock blocks will absorb any shocks that may arise in transit and thus protect the wheels and parts of the automobile against injury.

It will be appreciated that an automobile is securely anchored between the chock blocks involving this invention and cannot readily bound off the floor in transit. As the present chock blocks also are capable of absorbing all shocks, it will be appreciated that the liability of damaging the car in transit is greatly reduced. It will therefore be apparent that in addition to the low cost of the chock blocks, they also perform a better and more efficient service than others heretofore used.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

1. In a chock block, a flexible body portion having an arcuate groove, and a mobile material in said body portion and means for securing said body portion to a base.

2. In a chock block, an expansible and contractile member having an arcuate periphery for receiving a portion of a tire, and a mobile material within said member.

3. The combination with a wheel, of a chock block engaging each side of said wheel, each block comprising a flexible portion conformable to variations and movements of the tire in transit and a tie member extending over said blocks and hub of said wheel.

4. In a chock block, a bag consisting of fabric material adapted for receiving mobile material and having an arcuate groove like portion for receiving a portion of a wheel.

5. In a chock block, a bag for receiving mobile material and having a groove like portion for receiving a portion of a wheel and having nailing strips extending along the sides thereof.

6. In a chock block, a pliable member having an arcuate groove and nailing strips along the sides thereof.

7. In a chock block, a pliable hollow member adapted to be filled with sand and having sheaths along its sides, and wooden nailing strips in said sheaths.

8. The combination with a wheel, of means for yieldingly anchoring the same comprising pliable shock absorbing members conformable to the periphery of said wheel, and positioned in opposed relation thereto, and means for tying said members against said wheel for limited rocking movement therewith.

9. The combination with a wheel, of a pliable chock block upon each side of the wheel, means for tying said chock blocks against said wheel and means for anchoring said chock blocks for limited rocking movement with said wheel.

In testimony whereof I have hereunto subscribed my name at Chicago, Cook County, Illinois.

KENNETH J. TOBIN.